United States Patent [19]

Arakawa

[11] Patent Number: 5,278,754
[45] Date of Patent: Jan. 11, 1994

[54] METHOD FOR PROCESSING RADIATION IMAGES

[75] Inventor: Satoshi Arakawa, Kanagawa, Japan

[73] Assignee: Fuji Photo Film Co., Ltd., Minamiashigara, Japan

[21] Appl. No.: 792,631

[22] Filed: Nov. 15, 1991

[30] Foreign Application Priority Data

Nov. 15, 1990 [JP] Japan .................. 2-309462

[51] Int. Cl.⁵ .......... G06F 15/00; G03G 5/16
[52] U.S. Cl. ............ 364/413.13; 364/413.14; 250/584; 250/484.2
[58] Field of Search .......... 364/413.13, 413.14; 250/327.2, 484.1, 484

[56] References Cited

U.S. PATENT DOCUMENTS

| | | | |
|---|---|---|---|
| 4,258,264 | 3/1981 | Kotera et al. | 250/327.1 |
| 4,346,295 | 8/1982 | Tanaka et al. | 250/327.2 |
| 4,527,061 | 7/1985 | Horikawa et al. | 250/327.2 |
| 5,081,357 | 1/1992 | Agano | 250/327.2 |

FOREIGN PATENT DOCUMENTS 56-11395 2/1981 Japan .

*Primary Examiner*—Donald E. McElheny, Jr.
*Assistant Examiner*—Frantzy Poinvil
*Attorney, Agent, or Firm*—Sughrue, Mion, Zinn, Macpeak & Seas

[57] ABSTRACT

First and second stimulable phosphor sheets are located such that the first stimulable phosphor sheet may be closer to a source of radiation. The radiation, which has passed through an object, is irradiated to the first and second stimulable phosphor sheets, and radiation images of the object are stored on the two sheets Read-out image signals A1 and A2 are respectively read out from the first and second stimulable phosphor sheets. Read-out image signals A1us and A2us are obtained respectively from high frequency component eliminating processes carried out on the read-out image signals A1 and A2. The read-out image signals A1us and A2us are subjected to a first operation expressed as $$B = A1us - \alpha \cdot A2us$$

where $\alpha$ is a coefficient, and $\alpha > 0$, and an image signal B is thereby obtained. A second operation is then carried out which is expressed as $$C = (1-\beta) \cdot A1 + \beta \cdot A2 - \gamma \cdot B$$

where $\beta$ and $\gamma$ are coefficients, $0 \leq \beta \leq 1$, and $\gamma > 0$, and an image signal C is thereby obtained. A visible radiation image, which is free of adverse effects from scattered radiation, is then reproduced from the image signal C.

23 Claims, 4 Drawing Sheets

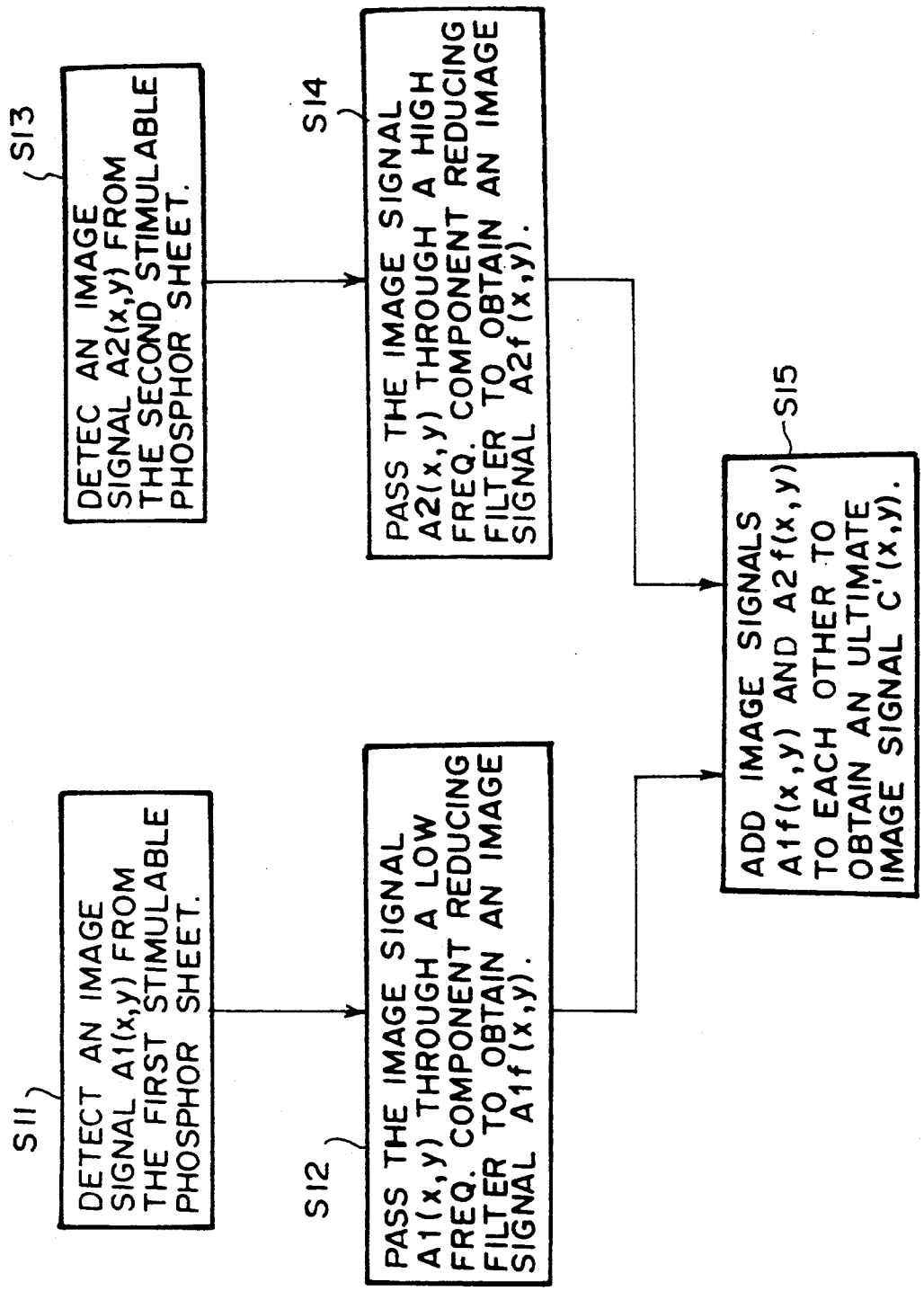

METHOD FOR PROCESSING RADIATION IMAGES

BACKGROUND OF THE INVENTION

1. Field of the Invention

This invention relates to a method for processing radiation images wherein, when radiation images are recorded and reproduced, read-out image signals, which have been obtained by reading out the recorded radiation images, are processed such that an image having good image quality may be obtained ultimately. This invention particularly relates to a method for processing radiation images, wherein each of radiation images is stored on a stimulable phosphor sheet, which is capable of storing energy from radiation thereon during its exposure to the radiation, the stimulable phosphor sheet on which the radiation image has been stored is then exposed to stimulating rays, which cause the stimulable phosphor sheet to emit light in proportion to the amount of energy stored thereon, the emitted light is photoelectrically detected and converted into an image signal representing the radiation image, and the image signal is thereafter processed and used in reproducing a visible radiation image.

2. Description of the Prior Art

When certain kinds of phosphors are exposed to radiation such as X-rays, α-rays, β-rays, γ-rays, cathode rays or ultraviolet rays, they store part of the energy of the radiation. Then, when the phosphor which has been exposed to the radiation is exposed to stimulating rays such as visible light, light is emitted by the phosphor in proportion to the amount of energy stored thereon during its exposure to the radiation. A phosphor exhibiting such properties is referred to as a stimulable phosphor.

As disclosed in U.S. Pat. Nos. 4,258,264 and 4,346,295 and Japanese Unexamined Patent Publication No. 56(1981)-11395, it has been proposed to use stimulable phosphors in radiation image recording and reproducing systems. Specifically, a sheet provided with a layer of the stimulable phosphor (hereinafter referred to as a stimulable phosphor sheet) is first exposed to radiation which has passed through an object, such as the human body. A radiation image of the object is thereby stored on the stimulable phosphor sheet. The stimulable phosphor sheet is then exposed to stimulating rays, such as a laser beam, which cause it to emit light in proportion to the amount of energy stored thereon during its exposure to the radiation. The light emitted by the stimulable phosphor sheet, upon stimulation thereof, is photoelectrically detected and converted into an electric image signal. The image signal is then used during the reproduction of the radiation image of the object as a visible image on a recording material such as photographic film, on a display device such as a cathode ray tube (CRT) display device, or the like.

Radiation image recording and reproducing systems which use stimulable phosphor sheets are advantageous over conventional radiography using silver halide photographic materials, in that images can be recorded even when the energy intensity of the radiation to which the stimulable phosphor sheet is exposed varies over a wide range. More specifically, since the amount of light which the stimulable phosphor sheet emits when being stimulated varies over a wide range and is proportional to the amount of energy stored thereon during its exposure to the radiation, it is possible to obtain an image having a desirable density regardless of the energy intensity of the radiation to which the stimulable phosphor sheet was exposed. In order to obtain the desired image density, an appropriate read-out gain is set when the emitted light is being detected and converted into an electric signal to be used in the reproduction of a visible image on a recording material, such as photographic film, or on a display device, such as a CRT display device.

Also, with the radiation image recording and reproducing systems which use stimulable phosphor sheets, after the radiation image, which has been stored on a stimulable phosphor sheet, is converted into an electric signal, appropriate image processing can be carried out on the electric signal. The electric signal, which has been obtained from the image processing, may then be used in reproducing a visible image of the radiation image on a recording material, such as photographic film, or on a display device, such as a CRT display device. In this manner, a visible radiation image can be obtained which has good image quality and can serve as an effective tool in, particularly, the efficient and accurate diagnosis of an illness. This is very advantageous in practice.

However, with the aforesaid radiation image recording and reproducing systems, when an object is exposed to radiation during the recording of a radiation image of the object on a stimulable phosphor sheet, scattering of the radiation (Thomson scattering or Compton scattering) is caused to occur by elastic collision or electromagnetic interaction between the radiation and substances constituting the object. The radiation is also scattered by elastic collision or electromagnetic interaction between the radiation and substances constituting the radiation image recording apparatus or between the radiation and substances constituting a cassette in which the stimulable phosphor sheet is housed. The radiation, which has thus been scattered, travels three-dimensionally in random directions and impinges upon the stimulable phosphor sheet. If the stimulable phosphor sheet is exposed to the principal radiation, which has passed through the object and which carries the image information of the object, and the scattered radiation, the contrast and the sharpness of the radiation image stored on the stimulable phosphor sheet with the principal radiation, which has passed through the object and which carries the image information of the object, will become bad.

Various attempts have heretofore been made in order to eliminate the adverse effects of the scattered radiation. As one such attempt, a method has heretofore been known wherein a grid member for absorbing the radiation is located between an object and a stimulable phosphor sheet. The grid member is constituted of a plurality of lead plates, which have a thickness of, for example, 1 mm or less and which are combined in a grid pattern or in a row pattern. In cases where the grid member is located in the manner described above, the scattered radiation, which travels in random directions, is absorbed by the lead plates of the grid member.

However, in cases where ordinary radiation images of human bodies are recorded, the amount of the scattered radiation is approximately as large as the amount of the principal radiation, which has passed through the object and which carries the image information of the object. Therefore, even if the grid member is located between the object and the stimulable phosphor sheet, the scattered radiation cannot be completely eliminated by the grid member. Also, if the grid member is used to eliminate the scattered radiation, part of the principal radiation, which has passed through the object and which carries the image information of the object, will be blocked by the grid member. Therefore, the amount of the principal radiation, which impinges upon the stimulable phosphor sheet, becomes small. As a result, the signal-to-noise ratio (S/N ratio) of the read-out image signal detected from the stimulable phosphor sheet becomes low, and the graininess of a visible image reproduced from the read-out image signal cannot be kept good.

SUMMARY OF THE INVENTION

The primary object of the present invention is to provide a method for processing radiation images with which adverse effects of scattered radiation are eliminated such that a visible radiation image having high contrast and high sharpness may be reproduced.

Another object of the present invention is to provide a method for processing radiation images with which a visible radiation image having good graininess can be reproduced.

The present invention provides a first method for processing radiation images, which comprises the steps of:

i) locating a first stimulable phosphor sheet and a second stimulable phosphor sheet, which are capable of storing energy from radiation thereon, such that said first stimulable phosphor sheet may be closer to a radiation source than said second stimulable phosphor sheet is, and both said first stimulable phosphor sheet and said second stimulable phosphor sheet may stand facing said radiation source, ii) placing an object between said radiation source and said first stimulable phosphor sheet, iii) exposing said first stimulable phosphor sheet and said second stimulable phosphor sheet to radiation, which has been produced by said radiation source and which has then passed through said object, radiation images of said object being thereby stored respectively on said first stimulable phosphor sheet and said second stimulable phosphor sheet, iv) thereafter exposing each of said first stimulable phosphor sheet and said second stimulable phosphor sheet to stimulating rays, which cause each of said first stimulable phosphor sheet and said second stimulable phosphor sheet to emit light in proportion to the amount of energy stored thereon during its exposure to the radiation, each of the light emitted by said first stimulable phosphor sheet and the light emitted by said second stimulable phosphor sheet being photoelectrically detected by a photodetector, whereby a read-out image signal A1, which is made up of a series of image signal components representing picture elements in the radiation image stored on said first stimulable phosphor sheet, and a read-out image signal A2, which is made up of a series of image signal components representing picture elements in the radiation image stored on said second stimulable phosphor sheet, are obtained, v) thereafter carrying out high frequency component eliminating processes respectively on said read-out image signal A1 and said read-out image signal A2, a read-out image signal A1us and a read-out image signal A2us being thereby obtained respectively from the high frequency component eliminating process carried out on said readout image signal A1 and from the high frequency component eliminating process carried out on said read-out image signal A2, vi) thereafter carrying out a first operation on the image signal components of said read-out image signal A1us
and said read-out image signal A2us, which image signal components represent corresponding picture elements in the radiation images, said first operation being expressed as $$B = A1us - \alpha \cdot A2us$$

where $\alpha$ is a coefficient, and $\alpha > 0$, whereby an image signal B is obtained, vii) thereafter carrying out a second operation on the image signal components of said read-out image signal A1, said read-out image signal A2, and said image signal B, which image signal components represent corresponding picture elements in the radiation images and in the image represented by said image signal B, said second operation being expressed as $$C = (1-\beta) \cdot A1 + \beta \cdot A2 - \gamma \cdot B$$

where $\beta$ and $\gamma$ are coefficients, $0 \leq \beta 1$, and $\gamma > 0$, whereby an image signal C is obtained, and viii) reproducing a visible radiation image from said image signal C.

In the first method for processing radiation images in accordance with the present invention, the first stimulable phosphor sheet, which is located closer to the radiation source than the second stimulable phosphor sheet is, stores more of energy from the scattered radiation than the second stimulable phosphor sheet.

The present invention also provides a second method for processing radiation images, which comprises the steps of:

i) locating a double-faced stimulable phosphor sheet having front and rear surfaces, from which radiation images are capable of being read out, such that said front surface stands facing a radiation source, ii) placing an object between said radiation source and said double-faced stimulable phosphor sheet, iii) exposing said double-faced stimulable phosphor sheet to radiation, which has been produced by said radiation source and which has then passed through said object, radiation images of said object being thereby stored respectively on said front surface and said rear surface of said double-faced stimulable phosphor sheet, iv) thereafter exposing each of said front surface and said rear surface of said double-faced stimulable phosphor sheet to stimulating rays, which cause each of said front surface and said rear surface of said double-faced stimulable phosphor sheet to emit light in proportion to the amount of energy stored thereon during its exposure to the radiation, each of the light emitted by said front surface of said double-faced stimulable phosphor sheet and the light emitted by said rear surface of said double-faced stimulable phosphor sheet being photoelectrically detected by a photodetector, whereby a read-out image signal A1, which is made up of a series of image signal components representing picture elements in the radiation image stored on said front surface of said double-faced stimulable phosphor sheet, and a read-out image signal A2, which is made up of a series of image signal components representing picture elements in the radiation image stored on said rear surface of said double-faced stimulable phosphor sheet, are obtained, v) thereafter carrying out high frequency component eliminating processes respectively on said read-out image signal A1 and said read-out image signal A2, a read-out image signal A1us and a read-out image signal A2us being thereby obtained respectively from the high frequency component eliminating process carried out on said read-out image signal A1 and from the high frequency component eliminating process carried out on said read-out image signal A2, vi) thereafter carrying out a first operation on the image signal components of said read-out image signal A1us and said read-out image signal A2us, which image signal components represent corresponding picture elements in the radiation images, said first operation being expressed as $$B = A1us - \alpha \cdot A2us$$

where $\alpha$ is a coefficient, and $\alpha > 0$, whereby an image signal B is obtained, vii) thereafter carrying out a second operation on the image signal components of said read-out image signal A1, said read-out image signal A2, and said image signal B, which image signal components represent corresponding picture elements in the radiation images and in the image represented by said image signal B, said second operation being expressed as $$C = (1-\beta) \cdot A1 + \beta \cdot A2 - \gamma \cdot B$$

where $\beta$ and $\gamma$ are coefficients, $0 \leq \beta \leq 1$, and $\gamma > 0$, whereby an image signal C is obtained, and viii) reproducing a visible radiation image from said image signal C.

In the second method for processing radiation images in accordance with the present invention, the front surface of the double-faced stimulable phosphor sheet, which is located closer to the radiation source than the rear surface of the double-faced stimulable phosphor sheet is, stores more of energy from the scattered radiation than the rear surface of the double-faced stimulable phosphor sheet.

In the first and second methods for processing radiation images in accordance with the present invention, a material, such as a Cu plate, capable of absorbing the scattered radiation, a grid member, or the like, may be located between the first stimulable phosphor sheet and the second stimulable phosphor sheet or between two stimulable phosphor layers of the double-faced stimulable phosphor sheet. In such cases, the difference in the content of energy from the scattered radiation between the first stimulable phosphor sheet and the second stimulable phosphor sheet or between two stimulable phosphor layers of the double-faced stimulable phosphor sheet can be kept large.

The present invention further provides a third method for processing radiation images, which comprises the steps of:

i) locating a stimulable phosphor sheet, which is capable of storing energy from radiation thereon, such that said stimulable phosphor sheet stands facing a radiation source, ii) placing an object between said radiation source and said stimulable phosphor sheet, iii) exposing said stimulable phosphor sheet to radiation, which has been produced by said radiation source and which has then passed through said object, a radiation image of said object being thereby stored on said stimulable phosphor sheet, iv) thereafter exposing said stimulable phosphor sheet twice to stimulating rays, which cause said stimulable phosphor sheet to emit light in proportion to the amount of energy stored thereon during its exposure to the radiation, each of the light emitted by said stimulable phosphor sheet during its first exposure to said stimulating rays and the light emitted by said stimulable phosphor sheet during its second exposure to said stimulating rays being photoelectrically detected by a photodetector, whereby a read-out image signal A1 and a read-out image signal A2, each of which is made up of a series of image signal components representing picture elements in the radiation image stored on said stimulable phosphor sheet, are obtained respectively during said first exposure of said stimulable phosphor sheet to said simulating rays and during said second exposure of said stimulable phosphor sheet to said stimulating rays, v) thereafter carrying out high frequency component eliminating processes respectively on said read-out image signal A1 and said read-out image signal A2, a read-out image signal A1us and a read-out image signal A2us being thereby obtained respectively from the high frequency component eliminating process carried out on said read-out image signal A1 and from the high frequency component eliminating process carried out on said read-out image signal A2, vi) thereafter carrying out a first operation on the image signal components of said read-out image signal A1us and said read-out image signal A2us, which image signal components represent corresponding picture elements in the radiation image read out during said first exposure of said stimulable phosphor sheet to said stimulating rays and in the radiation image read out during said second exposure of said stimulable phosphor sheet to said stimulating rays, said first operation being expressed as $$B = A1us - \alpha \cdot A2us$$

where $\alpha$ is a coefficient, and $\alpha > 0$, whereby an image signal B is obtained, vii) thereafter carrying out a second operation on the image signal components of said read-out image signal A1, said read-out image signal A2, and said image signal B, which image signal components represent corresponding picture elements in the radiation images read out during said first and second exposures of said stimulable phosphor sheet to said stimulating rays and in the image represented by said image signal B, said second operation being expressed as $$C = (1-\beta) \cdot A1 + \beta \cdot A2 - \gamma \cdot B$$

where $\beta$ and $\gamma$ are coefficients, $0 \leq \beta \leq 1$, and $\gamma > 0$, whereby an image signal C is obtained, and viii) reproducing a visible radiation image from said image signal C.

In the third method for processing radiation images in accordance with the present invention, two image read-pout operations are carried out on the single stimulable phosphor sheet. The first image read-out operation is carried out on the stimulable phosphor sheet while it is containing a large amount of energy from the scattered radiation. The second image read-out operation is carried out on the stimulable phosphor sheet which now contains only a small amount of energy from the scattered radiation.

Specifically, with the first, second, and third methods for processing radiation images in accordance with the present invention, two read-out image signals are generated which include image signal components representing different levels of energy from the scattered radiation. Thereafter, the high frequency components are removed from the two read-out image signals. The signal, which represents the difference between the two read-out signals, i.e. which represents the levels of the scattered radiation components, is then generated. The two read-out image signals are weighted and added to each other, and the difference signal is subtracted from the sum of the two read-out image signals. A visible radiation image is then reproduced from the signal, which has been obtained in this manner. The visible radiation image thus reproduced is free of adverse effects from the scattered radiation.

The present invention still further provides a fourth method for processing radiation images, which comprises the steps of:

i) locating a first stimulable phosphor sheet and a second stimulable phosphor sheet, which are capable of storing energy from radiation thereon, such that said first stimulable phosphor sheet may be closer to a radiation source than said second stimulable phosphor sheet is, and both said first stimulable phosphor sheet and said second stimulable phosphor sheet may stand facing said radiation source, ii) placing an object between said radiation source and said first stimulable phosphor sheet, iii) exposing said first stimulable phosphor sheet and said second stimulable phosphor sheet to radiation, which has been produced by said radiation source and which has then passed through said object, radiation images of said object being thereby stored respectively on said first stimulable phosphor sheet and said second stimulable phosphor sheet, iv) thereafter exposing each of said first stimulable phosphor sheet and said second stimulable phosphor sheet to stimulating rays, which cause each of said first stimulable phosphor sheet and said second stimulable phosphor sheet to emit light in proportion to the amount of energy stored thereon during its exposure to the radiation, each of the light emitted by said first stimulable phosphor sheet and the light emitted by said second stimulable phosphor sheet being photoelectrically detected by a photodetector, whereby a read-out image signal A1, which is made up of a series of image signal components representing picture elements in the radiation image stored on said first stimulable phosphor sheet, and a read-out image signal As, which is made up of a series of image signal components representing picture elements in the radiation image stored on said second stimulable phosphor sheet, are obtained, v) thereafter passing said read-out image signal A1 through a low frequency component reducing filter, a read-out image signal A1f being thereby obtained, vi) passing said read-out image signal A2 through a high frequency component reducing filter, which has a characteristic such that the sum of said characteristic and the characteristic of said low frequency component reducing filter may be approximately flat, a read-out image signal A2f being thereby obtained, vii) thereafter adding said read-out image signal A1f and said read-out image signal A2f to each other, an image signal C' being thereby obtained, and viii) reproducing a visible radiation image from said image signal C'.

In the fourth method for processing radiation images in accordance with the present invention, the first stimulable phosphor sheet, which is located closer to the radiation source than the second stimulable phosphor sheet is, stores more of energy from the scattered radiation than the second stimulable phosphor sheet.

The present invention further provides a fifth method for processing radiation images, which comprises the steps of:

i) locating a double-faced stimulable phosphor sheet having front and rear surface, from which radiation images are capable of being read out, such that said front surface stands facing a radiation source, ii) placing an object between said radiation source and said double-faced stimulable phosphor sheet, iii) exposing said double-faced stimulable phosphor sheet to radiation, which has been produced by said radiation source and which has then passed through said object, radiation images of said object being thereby stored respectively on said front surface and said rear surface of said double-faced stimulable phosphor sheet, iv) thereafter exposing each of said front surface and said rear surface of said double-faced stimulable phosphor sheet to the stimulating rays, which cause each of said front surface and said rear surface of said double-faced stimulable phosphor sheet to emit light in proportion to the amount of energy stored thereon during its exposure to the radiation, each of the light emitted by said front surface of said double-faced stimulable phosphor sheet and the light emitted by said rear surface of said double-faced stimulable phosphor sheet being photoelectrically detected by a photodetector, whereby a read-out image signal A1, which is made up of a series of image signal components representing picture elements in the radiation image stored on said front surface of said double-faced stimulable phosphor sheet, and a read-out image signal A2, which is made up of a series of image signal components representing picture elements in the radiation image stored on said rear surface of said double-faced stimulable phosphor sheet, are obtained, v) thereafter passing said read-out image signal A1 through a low frequency component reducing filter, a read-out image signal A1f being thereby obtained, vi) passing said read-out image signal A2 through a high frequency component reducing filter, which has a characteristic such that the sum of said characteristic and the characteristic of said low frequency component reducing filter may be approximately flat, a read-out image signal A2f being thereby obtained, vii) thereafter adding said read-out image signal A1f and said read-out image signal A2f to each other, an image signal C' being thereby obtained, and viii) reproducing a visible radiation image from said image signal C'.

In the fifth method for processing radiation images in accordance with the present invention, the front surface of the double-faced stimulable phosphor sheet, which is located closer to the radiation source than the rear surface of the double-faced stimulable phosphor sheet is, stores more of energy from the scattered radiation than the rear surface of the double-faced stimulable phosphor sheet.

The present invention further provides a sixth method for processing radiation images, which comprises the steps of:

i) locating a stimulable phosphor sheet, which is capable of storing energy from radiation thereon, such that said stimulable phosphor sheet stands facing a radiation source, ii) placing an object between said radiation source and said stimulable phosphor sheet, iii) exposing said stimulable phosphor sheet to radiation, which has been produced by said radiation source and which has then passed through said object, a radiation image of said object being thereby stored on said stimulable phosphor sheet, iv) thereafter exposing said stimulable phosphor sheet twice to stimulating rays, which cause said stimulable phosphor sheet to emit light in proportion to the amount of energy stored thereon during its exposure to the radiation, each of the light emitted by said stimulable phosphor sheet during its first exposure to said stimulating rays and the light emitted by said stimulable phosphor sheet during its second exposure to said stimulating rays being photoelectrically detected by a photodetector, whereby a read-out image signal A1 and a read-out image signal A2, each of which is made up of a series of image signal components representing picture elements in the radiation image stored on said stimulable phosphor sheet, are obtained respectively during said first exposure of said stimulable phosphor sheet to said stimulating rays and during said second exposure of said stimulable phosphor sheet to said stimulating rays, v) thereafter passing said read-out image signal A1 through a low frequency component reducing filter, a read-out image signal A1f being thereby obtained, vi) passing said read-out image signal A2 through a high frequency component reducing filter, which has a characteristic such that the sum of said characteristic and the characteristic of said low frequency component reducing filter may be approximately flat, a read-out image signal A2f being thereby obtained, vii) thereafter adding said read-out image signal A1f and said read-out image signal A2f to each other, an image signal C' being thereby obtained, and viii) reproducing a visible radiation image from said image signal C'.

In the sixth method for processing radiation images in accordance with the present invention, two image read-out operations are carried out on the single stimulable phosphor sheet. The first image read-out operation is carried out on the stimulable phosphor sheet while it is containing a large amount of energy from the scattered radiation. The second image read-out operation is carried out on the stimulable phosphor sheet which now contains only a small amount of energy from the scattered radiation.

Specifically, with the fourth, fifth, and sixth methods for processing radiation images in accordance with the present invention, two read-out image signals are generated which include image signal components representing different levels of energy from the scattered radiation. Thereafter, one of the two read-out image signals is passed through the low frequency component reducing filter, and the other read-out image signal is passed through the high frequency component reducing filter. The high frequency component reducing filter has a characteristic such that the sum of the characteristic of the high frequency component reducing filter and the characteristic of the low frequency component reducing filter may be approximately flat. Thereafter, the two read-out image signals, which have been obtained from the low frequency component reducing filter and high frequency component reducing filter, are added to each other. A visible radiation image is then reproduced from the sum signal, which has been obtained in this manner. The visible radiation image thus reproduced is free of adverse effects from the scattered radiation.

The term "low frequency component reducing filter" as used herein means a filter, which is capable of reducing more of the low frequency components than the high frequency components. Also, the term "high frequency component reducing filter" as used herein means a filter, which is capable of reducing more of the high frequency components than the low frequency components. The low frequency component reducing filter may typically be a low frequency cutting filter, and the high frequency component reducing filter may typically be a high frequency cutting filter.

With the first and fourth methods for processing radiation images in accordance with the present invention, the first stimulable phosphor sheet and the second stimulable phosphor sheet are located such that the first stimulable phosphor sheet may be closer to the radiation source than the second stimulable phosphor sheet is. The first stimulable phosphor sheet and the second stimulable phosphor sheet are exposed to the radiation, which has passed through the object. The read-out image signal A1, which includes high levels of adverse effects from the scattered radiation, is detected from the first stimulable phosphor sheet, upon which the radiation having passed through the object impinges directly. Also, the read-out image signal A2, which includes low levels of adverse effects from the scattered radiation, is detected from the second stimulable phosphor sheet, upon which the radiation having passed through the object and having thereafter passed through the first stimulable phosphor sheet impinges.

With the second and fifth methods for processing radiation images in accordance with the present invention, the double-faced stimulable phosphor sheet having the front and rear surfaces, from which radiation images are capable of being read out, are located such that the front surface stands facing the radiation source. The double-faced stimulable phosphor sheet is then exposed to the radiation, which has passed through the object. The read-out image signal A1, which includes high levels of adverse effects from the scattered radiation, is detected from the front surface of the double-faced stimulable phosphor sheet, upon which the radiation having passed through the object impinges directly. Also, the read-out image signal A2, which includes low levels of adverse effects from the scattered radiation, is detected from the rear surface of the double-faced stimulable phosphor sheet, upon which the radiation having passed through the object and having thereafter passed through the front surface of the stimulable phosphor sheet impinges.

With the third and sixth methods for processing radiation images in accordance with the present invention, a single stimulable phosphor sheet is exposed to the radiation, which has passed through the object, and the radiation image of the object is thereby stored on the stimulable phosphor sheet. Two image read-out operations are carried out on the stimulable phosphor sheet.

During the first image read-out operation, the image information is read out primarily from part of the stimulable phosphor sheet in the vicinity of its surface. Therefore, the read-out image signal A1, which includes high levels of adverse effects from the scattered radiation, is obtained from the first image read-out operation. During the second image read-out operation, the image information is read out primarily from part of the stimulable phosphor sheet deep from surface. Therefore, the read-out image signal A2, which includes low levels of adverse effects from the scattered radiation, is obtained from the second image read-out operation.

As described above, with the first to sixth methods for processing radiation images in accordance with the present invention, two read-out image signals are obtained which represent the image information of the same object and which include the image signal components representing different levels of energy from the scattered radiation.

Also, with the first, second, and third methods for processing radiation images in accordance with the present invention, in order for noise to be eliminated, the high frequency component eliminating processes are carried out respectively on the two read-out image signals, which have been obtained in the manner described above. Thereafter, the two read-out image signals, which have been obtained from the high frequency component eliminating processes, are weighted and subtracted from each other, and the signal representing the levels of the scattered radiation components is thereby generated. The operation with the predetermined formula is then carried out by using the value of the signal representing the levels of the scattered radiation components, and the image signal obtained from this operation is used in reproducing a visible radiation image. Therefore, with the first, second, and third methods for processing radiation images in accordance with the present invention, the grid member such as the one used in the conventional techniques need not be used, and a reproduced visible radiation image, which is free of adverse effects from the scattered radiation, can be obtained more reliably than with the conventional techniques. Accordingly, a visible radiation image can be reproduced which has high contrast and high sharpness. Also, when the ultimate image signal is obtained from the operations carried out on the read-out image signals, the high frequency components of the two read-out image signals are superposed one upon the other. Therefore, the graininess of the radiation image can be kept good.

With the fourth, fifth, and sixth methods for processing radiation images in accordance with the present invention, the read-out image signal A1, which includes the image signal components representing high levels of energy from the scattered radiation, is passed through the low frequency component reducing filter. Energy from the scattered radiation is stored as the low frequency components on the stimulable phosphor sheet. Additionally, a large amount of information from the scattered radiation is contained in the read-out image signal A1. Therefore, by carrying out the filtering process, in which the low frequency component reducing filter is employed, on the read-out image signal A1, the amount of information from the scattered radiation can be reduced in the reproduced visible radiation image. Also, with the fourth, fifth, and sixth methods for processing radiation images in accordance with the present invention, the read-out image signal A2 is passed through the high frequency component reducing filter. The high frequency component reducing filter has a characteristic such that the sum of the characteristic of the high frequency component reducing filter and the characteristic of the low frequency component reducing filter may be approximately flat. Therefore, the read-out image signal A2f, which has been obtained from the high frequency component reducing filter, has a characteristic such that it may cover the depression in the characteristic f the read-out image signal A1f, which has been obtained from the low frequency component reducing filter. As a result, the image signal C′ obtained by adding the read-out image signals A1f and A2f to each other has the same frequency characteristics as the original images. Accordingly, from the image signal C′, a visible radiation image can be reproduced which has high contrast, high sharpness, and good graininess.

BRIEF DESCRIPTION OF THE DRAWINGS

FIG. 4 is a flow chart showing how a filtering process is carried out in another embodiment of the method for processing radiation images in accordance with the present invention.

DESCRIPTION OF THE PREFERRED EMBODIMENTS

The present invention will hereinbelow be described in further detail with reference to the accompanying drawings.

Figure 1:
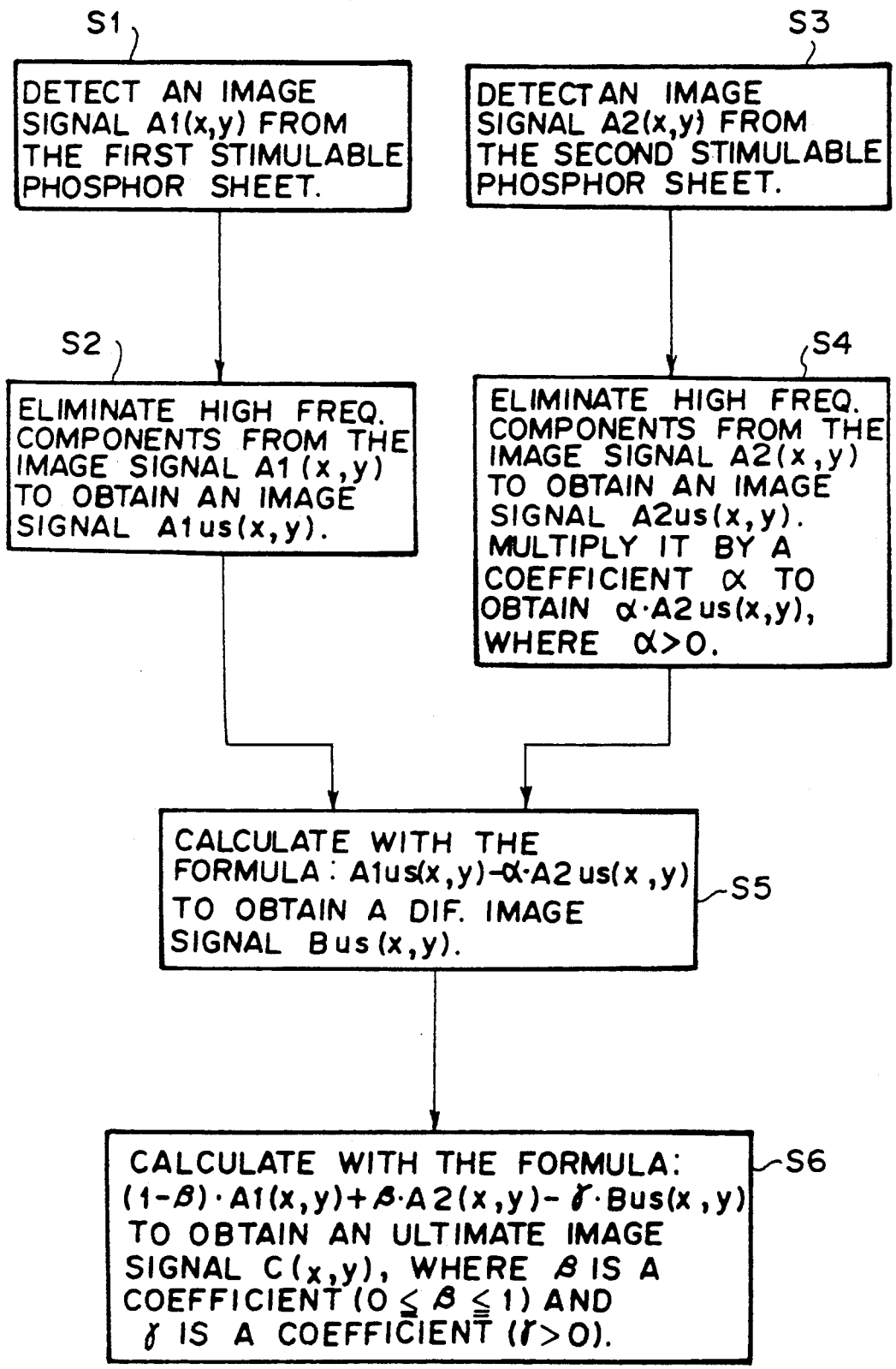
FIG. 1 is a flow chart showing how operation processing is carried out in an embodiment of the method for processing radiation images in accordance with the present invention.
Figure 2:
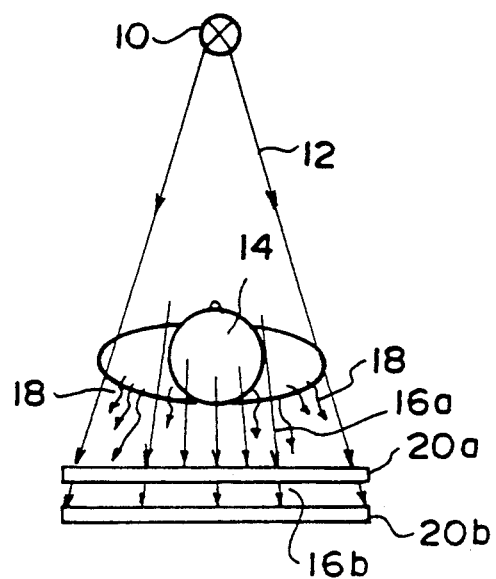
FIG. 2 is a schematic view showing how radiation images are stored on stimulable phosphor sheets in the embodiment of FIG. 1.
Figure 3:
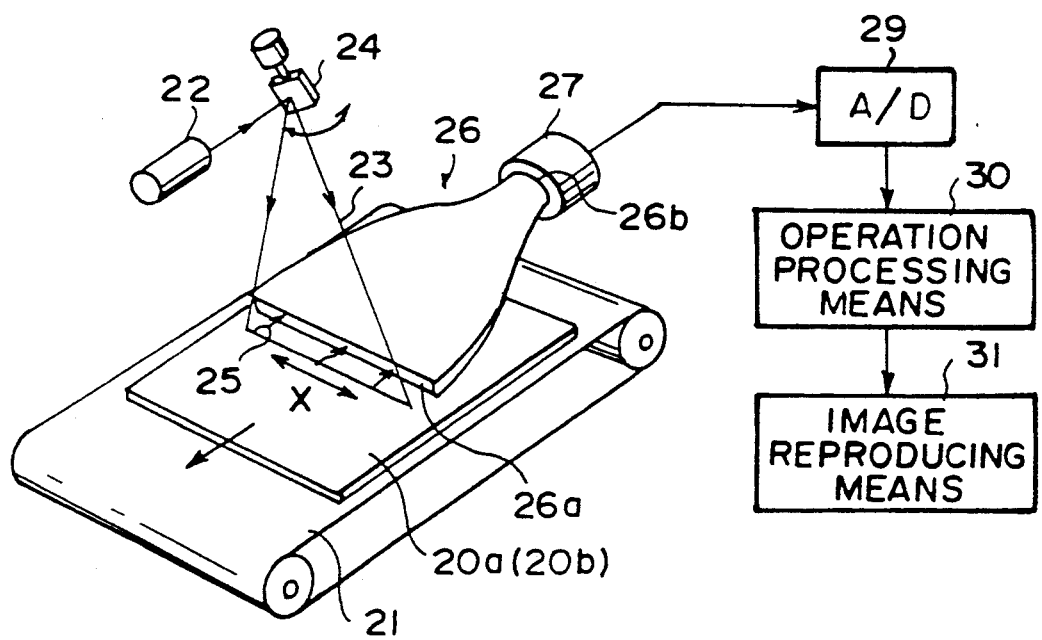
FIG. 3 is a schematic view showing a radiation image read-out and reproducing apparatus for carrying out the embodiment of FIG. 1.

FIG. 1 is a flow chart showing how operation processing is carried out in an embodiment of the method for processing radiation images in accordance with the present invention. FIG. 2 is a schematic view showing how radiation images are stored on stimulable phosphor sheets in the embodiment of FIG. 1. FIG. 3 is a schematic view showing a radiation image read-out and reproducing apparatus for carrying out the embodiment of FIG. 1.

As illustrated in FIG. 2, a first stimulable phosphor sheet 20a is located facing a radiation source 10, which may be constituted of an X-ray tube, or the like. A second stimulable phosphor sheet 20b is located under the first stimulable phosphor sheet 20a. Also, an object (in this case, a human body) 14 is placed between the first stimulable phosphor sheet 20a and the radiation source 10. The first stimulable phosphor sheet 20a and the second stimulable phosphor sheet 20b are of the type described above.

Thereafter, the radiation source 10 is activated to produce radiation 12, which may be X-rays, or the like. The radiation 12 is irradiated to the object 14. The radiation (i.e. the principal radiation) 16a, which has passed through the object 14 and which carries the image information of the object 14, impinges upon the first stimulable phosphor sheet 20a. Also, the radiation (i.e. the principal radiation) 16b, which has then passed through the first stimulable phosphor sheet 20a and which carries the image information of the object 14, impinges upon the second stimulable phosphor sheet 20b. The first stimulable phosphor sheet 20a stores part of energy from the principal radiation 16a, and the second stimulable phosphor sheet 20b stores part of energy from the principal radiation 16b. Specifically, the radiation image information concerning the object 14, which is carried by the principal radiation 16a, is stored on the first stimulable phosphor sheet 20a. Also, the radiation image information concerning the object 14, which is carried by the principal radiation 16b, is stored on the second stimulable phosphor sheet 20b.

The amount of the principal radiation 16b, which impinges upon the second stimulable phosphor sheet 20b, is smaller than the amount of the principal radiation 16a, which impinges upon the first stimulable phosphor sheet 20a, by a value in accordance with how much the first stimulable phosphor sheet 20a absorbs the principal radiation 16a. Therefore, when each of the first stimulable phosphor sheet 20a and the second stimulable phosphor sheet 20b, on which the radiation image information has been stored, is exposed to stimulating rays in the manner, which will be described later, the ratio of the amount of light emitted by a background region on the first stimulable phosphor sheet 20a to the amount of light emitted by a background region on the second stimulable phosphor sheet 20b will be approximately equal to 2:1.

When the object 14 is exposed to the radiation 12 in the manner described above, part of the radiation 12 is scattered by the object 14, or the like, as indicated by arrows 18, 18, ... in the manner described above. The scattered radiation 18 travels three-dimensionally in random directions. Part of the scattered radiation 18 impinges upon the first stimulable phosphor sheet 20a and the second stimulable phosphor sheet 20b. If the first stimulable phosphor sheet 20a is exposed to the scattered radiation 18 as well as to the principal radiation 16a, the contrast and the sharpness of the radiation image, which is stored on the first stimulable phosphor sheet 20a with the principal radiation 16a, will become low. Also, if the second stimulable phosphor sheet 20b is exposed to the scattered radiation 18 as well as to the principal radiation 16b, the contrast and the sharpness of the radiation image, which is stored on the second stimulable phosphor sheet 20b with the principal radiation 16b, will become low.

How the adverse effects from the scattered radiation 18 are eliminated and a radiation image having high contrast and high sharpness is thereby obtained will be described hereinbelow.

In the radiation image read-out and reproducing apparatus of FIG. 3, each of the radiation image, which has been stored on the first stimulable phosphor sheet 20a, and the radiation image, which has been stored on the second stimulable phosphor sheet 20b, is read out. Each of the first stimulable phosphor sheet 20a and the second stimulable phosphor sheet 20b is conveyed in a sub-scanning direction indicated by the arrow Y by a sheet conveyance means 21. The sheet conveyance means 21 may be constituted of an endless belt, or the like. A laser beam 23, which serves as stimulating rays, is produced by a laser beam source 22, and is deflected by a light deflector 24, such as a rotating polygon mirror. Thereafter, the laser beam 23 is caused to scan the first stimulable phosphor sheet 20a or the second stimulable phosphor sheet 20b in main scanning directions indicated by the double headed arrow X, which directions are approximately normal to the sub-scanning direction indicated by the arrow Y.

When the first stimulable phosphor sheet 20a or the second stimulable phosphor sheet 20b is exposed to the laser beam 23, the exposed portion of the stimulable phosphor sheet emits light 25 in an amount proportional to the amount of energy stored thereon during its exposure to the radiation. The emitted light 25 is guided by a light guide member 26 and photoelectrically detected by a photomultiplier 27, which serves as a photodetector.

The light guide member 26 is made from a light guiding material such as an acrylic plate and has a linear light input face 26a, positioned so that it extends along the main scanning line on the first stimulable phosphor sheet 20a or the second stimulable phosphor sheet 20b, and a ring-shaped light output face 26b, positioned so that it is in close contact with a light receiving face of the photomultiplier 27. The emitted light 25, which has entered the light guide member 26 at its light input face 26a, is guided through repeated total reflection inside of the light guide member 26, emanates from the light output face 26b, and is received by the photomultiplier 27. In this manner, the amount of the emitted light 25, which amount represents the radiation image, is converted into an electric signal by the photomultiplier 27. The shape, the material, and the manufacturing process, which are suitable for the light guide member 26, are described in detail in, for example, U.S. Pat. No. 4,346,295.

In the manner described above, an output signal (read-out image signal) is generated by the photomultiplier 27. The output signal is digitized into a digital image signal in an A/D converter 29. In this manner, a digital read-out image signal $A1(x,y)$ is detected from the first stimulable phosphor sheet 20a, and a digital read-out image signal $A2(x,y)$ is detected from the second stimulable phosphor sheet 20b. Thereafter, the read-out image signal $A1(x,y)$ and the read-out image signal $A2(x,y)$ are fed into an operation processing means 30. The read-out image signal $A1(x,y)$ and the read-out image signal $A2(x,y)$ are stored in an image file on a magnetic disk, an optical disk, a magnetic tape, or the like, in the operation processing means 30. The read-out image signal $A1(x,y)$ and the read-out image signal $A2(x,y)$ are then read from the image file and subjected to predetermined operation processing. The operation processing is carried out in the operation processing means 30. An image signal obtained from the operation processing is fed into an image reproducing means 31, which may be constituted of a CRT display device, a light beam scanning recording apparatus, or the like, and is utilized in reproducing a visible radiation image.

How the operation processing is carried out in the operation processing means 30 will be described hereinbelow with reference to FIG. 1.

With reference to FIG. 1, in a step S1, the read-out image signal $A1(x,y)$ is read out from the first stimulable phosphor sheet 20a. The read-out image signal $A1(x,y)$ is fed into the operation processing means 30. Thereafter, in a step S2, the high frequency components are eliminated from the read-out image signal $A1(x,y)$, and a read-out image signal $A1us(x,y)$ is thereby obtained. In a step S3, the read-out image signal $A2(x,y)$ is read out from the second stimulable phosphor sheet 20b. The read-out image signal $A2(x,y)$ is fed into the operation processing means 30. Thereafter, in a step S4, the high frequency components are eliminated from the read-out image signal A2(x,y), and a read-out image signal A2us(x,y) is thereby obtained.

Elimination of the high frequency components may be carried out with one of various known processes, for example, a mean value process, a median filtering process, or a filtering process in the spatial frequency zone. By way of example, in cases where the mean value process is employed, each of the read-out image signal A1(x,y) and the read-out image signal A2(x,y) is divided into a 100×100 matrix. In this manner, in this embodiment, the levels of the scattered radiation components are calculated from the read-out image signal A1us(x,y) and the read-out image signal A2us(x,y), from which the high frequency components have been eliminated. Therefore, noise can be minimized, and the graininess of a reproduced visible radiation image can be kept good.

Ordinarily, the scattered radiation components are distributed in a pattern of very low frequency. Therefore, in order for the scattered radiation components to be eliminated, the frequency components of, for example, 0.1 cy/mm or less are removed.

Thereafter, in the step S4, the read-out image signal A2us(x,y) is multiplied by a coefficient $\alpha$, where $\alpha > 0$. By way of example, the coefficient $\alpha$ represents the ratio of the amount of light emitted by a background region on the first stimulable phosphor sheet 20a to the amount of light emitted by a background region on the second stimulable phosphor sheet 20b. In such cases, the value of this coefficient is set to 2.

Thereafter, in a step S5, weighted subtraction is carried out with the formula $$A1us(x,y) - \alpha \cdot A2us(x,y)$$

and a difference image signal Bus(x,y) is thereby obtained. The difference image signal Bus(x,y) is made up of a series of the image signal components representing the levels of energy from the scattered radiation. In cases where the read-out image signal A1(x,y) and the read-out image signal A2(x,y) were converted into logarithmic values and were then fed into the operation processing means 30, inverse logarithmic conversion is carried out on the read-out image signal A1us(x,y) and the read-out image signal A2us(x,y) before they are used in calculating the values of the difference image signal Bus(x,y).

Thereafter, in a step S6, an operation is carried out with the formula $$(1-\beta)\cdot A1(x,y) + \beta \cdot A2(x,y) - \gamma \cdot Bus(x,y)$$

and an ultimate image signal C(x,y) is thereby obtained. In this formula, the coefficients $\beta$ and $\gamma$ are weight factors and are set to values falling within the range of $0 \leq \beta \leq 1$, and $\gamma > 0$. In cases where inverse logarithmic conversion was carried out on the read-out image signal A1us(x,y) and the read-out image signal A2us(x,y) in the step S5, inverse logarithmic conversion is also carried out on the read-out image signal A1(x,y) and the read-out image signal A2(x,y) in the step S6 before the aforesaid operation in the step 6 is carried out. Also, in such cases, the ultimate image signal C(x,y), which has thus been obtained, should be converted into logarithmic values and should then be fed out of the operation processing means 30.

The operation processing means 30 is provided with an image processing circuit, which carries out predetermined image processing, such as gradation processing or frequency response processing, on the ultimate image signal C(x,y).

In the image reproducing means 31, a visible radiation image is reproduced from the ultimate image signal C(x,y), which has been received from the operation processing means 30. The visible radiation image thus obtained is free of image signal components due to the scattered radiation and has higher contrast and higher sharpness than those obtained with the conventional techniques. Also, in the step 6, the high frequency components of the read-out image signal A1(x,y) and the high frequency components of the read-out image signal A2(x,y) are superposed one upon the other. Therefore, a visible radiation image having a high S/N ratio and good graininess can be obtained.

In this embodiment, during the recording of the radiation images, a material, such as a metal plate, which is capable of absorbing the scattered radiation, should preferably be inserted between the first stimulable phosphor sheet 20a and the second stimulable phosphor sheet 20b. In such cases, the differences in the levels of the image signal components due to the scattered radiation between the read-out image signal A1(x,y) and the read-out image signal A2(x,y) can be kept large.

In the embodiment described above, the first stimulable phosphor sheet 20a and the second stimulable phosphor sheet 20b are located such that the first stimulable phosphor sheet 20a may be closer to the radiation source 10 than the second stimulable phosphor sheet 20b is. The first stimulable phosphor sheet 20a and the second stimulable phosphor sheet 20b are exposed to the radiation, which has passed through the object 14. The read-out image signal A1(x,y) is detected from the first stimulable phosphor sheet 20a, upon which the radiation having passed through the object 14 impinges directly and which therefore includes high levels of adverse effects from the scattered radiation. Also, the read-out image signal A2(x,y) is detected from the second stimulable phosphor sheet 20b, upon which the radiation having passed through the object 14 and having thereafter passed through the first stimulable phosphor sheet 20a impinges and which therefore includes only low levels of adverse effects from the scattered radiation. Operation processes are then carried out on the read-out image signal A1(x,y) and the read-out image signal A2(x,y), and the ultimate image signal C(x,y) is thereby obtained which is free of image signal components due to the scattered radiation.

However, in order for an ultimate image signal free of image signal components due to the scattered radiation to be obtained, it is sufficient for the read-out image signal A1(x,y) and the read-out image signal A2(x,y) to be obtained which include the image signal components representing different levels of energy from the scattered radiation. No limitation is imposed on how the read-out image signal A1(x,y) and the read-out image signal A2(x,y) are obtained. Embodiments of the method for processing radiation images in accordance with the present invention other than the aforesaid embodiment wherein the two stimulable phosphor sheets are located in the manner described above will be described hereinbelow.

Specifically, instead of the first stimulable phosphor sheet 20a and the second stimulable phosphor sheet 20b being employed as in the aforesaid embodiment, a double-faced stimulable phosphor sheet having the front and rear surfaces, from which radiation images are capable of being read out, may be located such that the front surface stands facing the radiation source. The double-faced stimulable phosphor sheet is then exposed to the radiation, which has passed through the object. Thereafter, a read-out image signal A1(x,y) is detected from the front surface of the double-faced stimulable phosphor sheet, upon which the radiation having passed through the object impinges directly and which therefore includes high levels of adverse effects from the scattered radiation. Also, the read out image signal A2(x,y) is detected from the rear surface of the double-faced stimulable phosphor sheet, upon which the radiation having passed through the object and having thereafter passed through the front surface of the double-faced stimulable phosphor sheet impinges and which therefore includes only low levels of adverse effects from the scattered radiation. Operation processes are then carried out on the read-out image signal A1(x,y) and the read-out image signal A2(x,y) in the same manner as that in the aforesaid embodiment. Also, in such cases, as in the aforesaid embodiment, an ultimate image signal C(x,y) can be obtained which is free of image signal components due to the scattered radiation.

As another alternative, instead of the first stimulable phosphor sheet 20a and the second stimulable phosphor sheet 20b being employed as in the aforesaid embodiment, a single stimulable phosphor sheet may be employed. The stimulable phosphor sheet is exposed to the radiation, which has passed through the object, and the radiation image of the object is thereby stored on the stimulable phosphor sheet. Two image read-out operations are then carried out on the stimulable phosphor sheet. During the first image read-out operation, the image information is read out from the stimulable phosphor sheet while it is containing a large amount of energy from the scattered radiation. In this manner, a read-out image signal A1 is obtained from the first image read-out operation. During the second image read-out operation, the image information is read out from the stimulable phosphor sheet, which now includes only a small amount of energy from the scattered radiation. In this manner, a read-out image signal A2 is obtained from the second image read-out operation. Operation processes are then carried out on the read-out image signal A1(x,y) and the read-out image signal A2(x,y) in the same manner as that in the aforesaid embodiment. Also, in such cases, as in the aforesaid embodiment, an ultimate image signal C(x,y) can be obtained which is free of image signal components due to the scattered radiation.

In this embodiment, between the first and second image read-out operations, the whole area of the stimulable phosphor sheet may be erased uniformly to such an extent that all of the stored image information may not be erased. In such cases, the differences in the levels of the image signal components due to the scattered radiation between the read-out image signal A1(x,y), which is obtained from the first image read-out operation, and the read-out image signal A2(x,y), which is obtained from the second image read-out operation, can be kept large.

Also, in the embodiment of FIG. 1, after the read-out image signal A1(x,y) and the read-out image signal A2(x,y) are obtained which include the image signal components representing different levels of energy from the scattered radiation, the high frequency components are eliminated from the read-out image signal A1(x,y) and the read-out image signal A2(x,y) in the steps S2 and S4. Thereafter, in the step 5, the weighted subtraction is carried out on the read-out image signal A1(x,y) and the read-out image signal A2(x,y), and the difference image signal Bus(x,y) is thereby obtained. In the step 6, the difference image signal Bus(x,y) is then subjected to the predetermined operation processing, and the ultimate image signal C(x,y) is thereby obtained which is free of image signal components due to the scattered radiation. A visible radiation image is then reproduced from the ultimate image signal C(x,y).

However, in order for a visible radiation image free of adverse effects from the scattered radiation to be obtained from the read-out image signal A1(x,y) and the read-out image signal A2(x,y), instead of the aforesaid signal processes (in the steps S2, S4, S5, and S6) being carried out, predetermined filtering processes may be carried out on the read-out image signal A1(x,y) and the read-out image signal A2(x,y), and thereafter an addition process may be carried out.

Specifically, as illustrated in FIG. 4, in a step S11, a read-out image signal A1(x,y), which includes the image signal components representing high levels of energy from the scattered radiation, is detected from the first stimulable phosphor sheet 20a. Thereafter, in a step S12, the read-out image signal A1(x,y) is passed through a low frequency component reducing filter, which has a predetermined characteristic, and a read-out image signal A1f(x,y) is thereby obtained. Also, in a step S13, a read-out image signal A2(x,y), which includes the image signal components representing low levels of energy from the scattered radiation, is detected from the second stimulable phosphor sheet 20b. Thereafter, in a step S14, the read-out image signal A2(x,y) is passed through a high frequency component reducing filter, which has a predetermined characteristic, and a read-out image signal A2f(x,y) is thereby obtained. In a step S15, the read-out image signal A1f(x,y) and the read-out image signal A2f(x,y), which have been obtained from the two filters, are then added to each other, and an ultimate image signal C'(x,y) is thereby obtained. Thereafter, a visible radiation image is reproduced from the ultimate image signal C'(x,y).

Figure 5A:
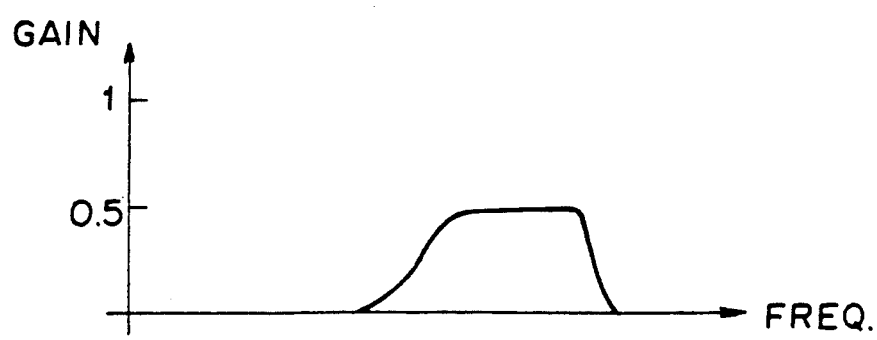
FIGS. 5A and 5B are graphs showing the characteristics of filters employed in the embodiment of FIG. 4.

In the embodiment of FIG. 4, as illustrated in FIG. 5A, the low frequency component reducing filter, which is used during the filtering process carried out on the read-out image signal A1(x,y), has a characteristic such that almost all of the low frequency components may be eliminated. The image signal components due to the scattered radiation have a low frequency. Additionally, the read-out image signal A1(x,y), which has been detected from the first stimulable phosphor sheet 20a, includes more of the image signal components due to the scattered radiation than the read-out image signal A2(x,y) detected from the second stimulable phosphor sheet 20b. Therefore, by carrying out the low frequency component eliminating process only on the read-out image signal A1(x,y), the image signal components due to the scattered radiation can be eliminated.

Figure 5B:
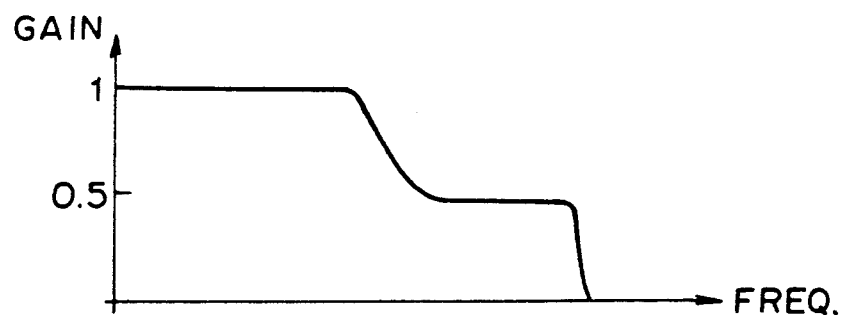

Also, as illustrated in FIG. 5B, the high frequency component reducing filter, which is used during the filtering process carried out on the read-out image signal A2(x,y), has a characteristic such that the high frequency components may be eliminated and the sum of the characteristic of the high frequency component reducing filter and the characteristic of the low frequency component reducing filter may be approximately flat. Therefore, the frequency characteristic of the ultimate image signal C'(x,y), which is obtained by adding the read-out image signal A1f(x,y) and the read-out image signal A2F(x,y) resulting from the two filters, is kept the same as the frequency characteristics of the original radiation images. The visible radiation image reproduced from the ultimate image signal C'(x,y) is free of the image signal components due to the scattered radiation and exhibits good graininess, which graininess has relation to, in particular, the high frequency components.

In the embodiment of FIG. 4, the filtering processes are carried out on the read-out image signal A1(x,y) and the read-out image signal A2(x,y), which have been detected from the first stimulable phosphor sheet 20a and the second stimulable phosphor sheet 20b and which include the image signal components representing different levels of energy from the scattered radiation. In this manner, the ultimate image signal C'(x,y) free of the image signal components due to the scattered radiation is obtained. However, no limitation is imposed on how the read-out image signal A1(x,y) and the read-out image signal A2(x,y) are obtained which include the image signal components representing different levels of energy from the scattered radiation.

Specifically, instead of the first stimulable phosphor sheet 20a and the second stimulable phosphor sheet 20b being employed as in the embodiment of FIG. 4, a double-faced stimulable phosphor sheet having the front and rear surfaces, from which radiation images are capable of being read out, may be located such that the front surface stands facing the radiation source. The double-faced stimulable phosphor sheet is then exposed to the radiation, which has passed through the object. Thereafter, a read-out image signal A1(x,y) is detected from the front surface of the double-faced stimulable phosphor sheet, upon which the radiation having passed through the object impinges directly and which therefore includes high levels of adverse effects from the scattered radiation. Also, the read-out image signal A2(x,y) is detected from the rear surface of the double-faced stimulable phosphor sheet, upon the which the radiation having passed through the object and having thereafter passed through the front surface of the double-faced stimulable phosphor sheet impinges and which therefore includes only low levels of adverse effects from the scattered radiation. Filtering processes are then carried out on the read-out image signal A1(x,y) and the read-out image signal A2(x,y) in the same manner as that in the embodiment of FIG. 4. Also, in such cases, as in the embodiment of FIG. 4, an ultimate image signal C'(x,y) can be obtained which is free of image signal components due to the scattered radiation.

As another alternative, instead of the first stimulable phosphor sheet 20a and the second stimulable phosphor sheet 20b being employed as in the aforesaid embodiment, a single stimulable phosphor sheet may be employed. The stimulable phosphor sheet is exposed to the radiation, which has passed through the object, and the radiation image of the object is thereby stored on the stimulable phosphor sheet. Two image read-out operations are then carried out on the stimulable phosphor sheet. During the first image read-out operation, the image information is read out from the stimulable phosphor sheet while it is containing a large amount of energy from the scattered radiation. In this manner, a read-out image signal A1 is obtained from the first image read-out operation. During the second image read-out operation, the image information is read out from the stimulable phosphor sheet, which now includes only a small amount of energy from the scattered radiation. In this manner, a read-out image signal A2 is obtained from the second image read-out operation. Filtering processes are then carried out on the read-out image signal A1(x,y) and the read-out image signal A2(x,y) in the same manner as that in the embodiment of FIG. 4. Also, in such cases, as in the embodiment of FIG. 4, an ultimate image signal C'(x,y) can be obtained which is free of image signal components due to the scattered radiation.

The two filters described above may be constituted of a hardware function or may be constituted of a software function with which calculations are carried out.

Instead of the ultimate image signal C'(x,y) being immediately fed into the image reproducing means 31, it may be temporarily stored on a storage medium, such as a magnetic disk or the magnetic tape.

Also, in the embodiments described above, the weighted subtraction is carried out on the digital read-out image signal A1us(x,y) and the digital read-out image signal A2us(x,y). Alternatively, an analog read-out image signal A1us(x,y) and an analog read-out image signal A2us(x,y) may be fed into an analog subtraction circuit, which carries out weighted subtraction on the signals. An analog difference image signal Bus(x,y) obtained in this manner may then be digitized by the A/D converter 29. Additionally, at this time, before the analog difference image signal Bus(x,y) is digitized by the A/D converter 29, it should preferably be converted into logarithmic values by an logarithmic amplifier. In such cases, the dynamic range of the ultimate image signal C(x,y) becomes narrow, and band compression can thereby be effected. Also, the ultimate image signal C(x,y) can be obtained which corresponds to the radiation decay constant distribution of the object.

Additionally, in order for various problems caused by variations in the conditions, under which the radiation images are recorded, to be eliminated and/or in order for a visible radiation image to be reproduced, which has good image quality and can serve as an effective tool in, for example, the efficient and accurate diagnosis of an illness, it is desirable to ascertain the characteristics of the image input information before the radiation image is reproduced as a visible image. The characteristics of the image input information depend on the conditions under which the radiation image is recorded on the first stimulable phosphor sheet 20a or the second stimulable phosphor sheet 20b, such as the level of the radiation dose used when the image was recorded, on the characteristics of the object, and on the image input pattern which is determined by the image recording mode used, such as plain image recording or contrasted image recording. Determining the characteristics of the image input information will hereinafter simply be referred to as "ascertaining the image input information."

In accordance with the image input information which has thus been ascertained, the read-out sensitivity of the photomultiplier 27 should be adjusted to an appropriate value, or appropriate signal processing should be carried out in the image processing circuit. It is also desirable to adjust the scale factor, which is employed during the A/D conversion, in accordance with the contrast and the sharpness in the image input pattern in order to optimize the resolution of the reproduced visible image.

The method as disclosed in U.S. Pat. No. 4,527,061 may be used to ascertain the image input information on the first stimulable phosphor sheet 20a or the second stimulable phosphor sheet 20b before the visible image is reproduced. Specifically, a preliminary read-out operation (hereinafter referred to as "preliminary read-out") may be carried out to ascertain the image input information of the radiation image, which is stored on the first stimulable phosphor sheet 20a or the second stimulable phosphor sheet 20b. During the preliminary readout, stimulating rays are used which have an energy level lower than the energy level of the stimulating rays used in a final read-out operation (hereinafter referred to as "final readout"), which obtains an image capable of being viewed and used, in particular, for diagnostic purposes. After the preliminary readout is completed, the final readout is carried out. In the final readout, the read-out gain and/or the scale factor is adjusted to an appropriate value, and/or appropriate signal processing of the image signal is conducted, on the basis of the image input information obtained during the preliminary readout. The image signal obtained from the preliminary readout can also be utilized in determining the weight factors $\alpha$, $\beta$, and $\gamma$, which are to be used during the subtraction.

In the aforesaid embodiments, the first stimulable phosphor sheet 20a and the second stimulable phosphor sheet 20b are not housed in cassettes, but are located facing the radiation source in bare conditions. However, the first stimulable phosphor sheet 20a and the second stimulable phosphor sheet 20b should preferably be housed in cassettes. In such cases, the relationship between the position of the first stimulable phosphor sheet 20a and the position of the second stimulable phosphor sheet 20b can be easily kept constant, and the efficiency with which the operations for recording the radiation images are carried out can be kept high.

What is claimed is:

1. A method for processing radiation images, which comprises the steps of:
   i) locating a first stimulable phosphor sheet and a second stimulable phosphor sheet for storing energy from radiation thereon, wherein said first stimulable phosphor sheet may be closer to a radiation source than said second stimulable phosphor sheet is, and both said first stimulable phosphor sheet and said second stimulable phosphor sheet may stand facing said radiation source,
   ii) placing an object between said radiation source and said first stimulable phosphor sheet,
   iii) exposing said first stimulable phosphor sheet and said second stimulable phosphor sheet to radiation, which has been produced by said radiation source and which has then passed through said object, radiation images of said object being thereby stored respectively on said first stimulable phosphor sheet and said second stimulable phosphor sheet,
   iv) thereafter exposing each of said first stimulable phosphor sheet and said second stimulable phosphor sheet to stimulating rays, which cause each of said first stimulable phosphor sheet and said second stimulable phosphor sheet to emit light in proportion to the amount of energy stored thereon during said exposure to the radiation, each of the light emitted by said first stimulable phosphor sheet and the light emitted by said second stimulable phosphor sheet being photoelectrically detected by a photodetector,
   whereby a read-out image signal A1, which is made up of a series of image signal components representing picture elements in the radiation image stored on said first stimulable phosphor sheet, and a read-out image signal A2, which is made up of a series of image signal components representing picture elements in the radiation image stored on said second stimulable phosphor sheet, are obtained,
   v) thereafter carrying out high frequency component eliminating processes respectively on said read-out image signal A1 and said read-out image signal A2, a read-out image signal A1us and a read-out image signal A2us being thereby obtained respectively from the high frequency component eliminating process carried out on said read-out image signal A1 and from the high frequency component eliminating process carried out on said read-out image signal A2,
   vi) thereafter carrying out a first operation on the image signal components of said read-out image signal A1us and said read-out image signal A2us, which image signal components represent corresponding picture elements in the radiation images, said first operation being expressed as $$B = A1us - \alpha \cdot A2us$$

where $\alpha$ is a coefficient, and $\alpha > 0$, whereby an image signal B is obtained,
   vii) thereafter carrying out a second operation on the image signal components of said read-out image signal A1, said read-out image signal A2, and said image signal B, which image signal components represent corresponding picture elements in the radiation images and in the image represented by said image signal B, said second operation being expressed as $$C = (1-\beta) \cdot A1 + \beta \cdot A2 - \gamma \cdot B$$

where $\beta$ and $\gamma$ are coefficients, $0 \leq \beta \leq 1$, and $\gamma > 0$, whereby an image signal C is obtained, and
   viii) reproducing a visible radiation image from said image signal C.

2. A method as defined in claim 1 wherein a member constituted of a material capable of absorbing the radiation, which has been scattered at least by said object, is located between said first stimulable phosphor sheet and said second stimulable phosphor sheet.

3. A method as defined in claim 1 wherein said radiation source is X-rays.

4. A method as defined in claim 1 wherein said stimulating rays are a laser beam.

5. A method for processing radiation images, which comprises the steps of:
   i) locating a double-faced stimulable phosphor sheet having front and rear surfaces, from which radiation images are read out, wherein said front surface stands facing a radiation source,
   ii) placing an object between said radiation source and said double-faced stimulable phosphor sheet,
   iii) exposing said double-faced stimulable phosphor sheet to radiation, which has been produced by said radiation source and which has then passed through said object, radiation images of said object being thereby stored respectively on said front surface and said rear surface of said double-faced stimulable phosphor sheet, iv) thereafter exposing each of said front surface and said rear surface of said double-faced stimulable phosphor sheet to stimulating rays, which cause each of said front surface and said rear surface of said double-faced stimulable phosphor sheet to emit light in proportion to the amount of energy stored thereon during said exposure to the radiation, each of the light emitted by said front surface of said double-faced stimulable phosphor sheet and the light emitted by said rear surface of said double-faced stimulable phosphor sheet being photoelectrically detected by a photodetector, whereby a read-out image signal A1, which is made up of a series of image signal components representing picture elements in the radiation image stored on said front surface of said double-faced stimulable phosphor sheet, and a read-out image signal A2, which is made up of a series of image signal components representing picture elements in the radiation image stored on said rear surface of said double-faced stimulable phosphor sheet, are obtained, v) thereafter carrying out high frequency component eliminating processes respectively on said read-out image signal A1 and said read-out image signal A2, a read-out image signal A1us and a read-out image signal A2us being thereby obtained respectively from the high frequency component eliminating process carried out on said read-out image signal A1 and from the high frequency component eliminating process carried out on said read-out image signal A2, vi) thereafter carrying out a first operation on the image signal components of said read-out image signal A1us and said read-out image signal A2us, which image signal components represent corresponding picture elements in the radiation images, said first operation being expressed as $$B = A1us - \alpha \cdot A2us$$

where $\alpha$ is a coefficient, and $\alpha > 0$, whereby an image signal B is obtained, vii) thereafter carrying out a second operation on the image signal components of said read-out image signal A1, said read-out image signal A2, and said image signal B, which image signal components represent corresponding picture elements in the radiation images and in the image represented by said image signal B, said second operation being expressed as $$C = (1 - \beta) \cdot A1 + \beta \cdot A2 - \gamma \cdot B$$

where $\beta$ and $\gamma$ are coefficients, $0 \leq \beta \leq 1$, and $\gamma > 0$, whereby an image signal C is obtained, and viii) reproducing a visible radiation image from said image signal C.

6. A method as defined in claim 5 further comprising dispersing a member comprising a material for absorbing the radiation, which has been scattered at least by said object, between said front surface and said rear surface of said double-faced stimulable phosphor sheet.

7. A method as defined in claim 5 wherein said radiation source is X-rays.

8. A method as defined in claim 5 wherein said stimulating rays are a laser beam.

9. A method for processing radiation images, which comprises the steps of:

i) locating a stimulable phosphor sheet for storing energy from radiation thereon, wherein said stimulable phosphor sheet stands facing a radiation source, ii) placing an object between said radiation source and said stimulable phosphor sheet, iii) exposing said stimulable phosphor sheet to radiation, which has been produced by said radiation source and which has then passed through said object, a radiation image of said object being thereby stored on said stimulable phosphor sheet, iv) thereafter exposing said stimulable phosphor sheet twice to stimulating rays, which cause said stimulable phosphor sheet to emit light in proportion to the amount of energy stored thereon during its exposure to the radiation, each of the light emitted by said stimulable phosphor sheet during its first exposure to said stimulating rays and the light emitted by said stimulable phosphor sheet during its second exposure to said stimulating rays being photoelectrically detected by a photodetector, whereby a read-out image signal A1 and a read-out image signal A2, each of which is made up of a series of image signal components representing picture elements in the radiation image stored on said stimulable phosphor sheet, are obtained respectively during said first exposure of said stimulable phosphor sheet to said stimulating rays and during said second exposure of said stimulable phosphor sheet to said stimulating rays, v) thereafter carrying out high frequency component eliminating processes respectively on said read-out image signal A1 and said read-out image signal A2, a read-out image signal A1us and a read-out image signal A2us being thereby obtained respectively from the high frequency component eliminating process carried out on said read-out image signal A1 and from the high frequency component eliminating process carried out on said read-out image signal A2, vi) thereafter carrying out a first operation on the image signal components of said read-out image signal A1us and said read-out image signal A2us, which image signal components represent corresponding picture elements in the radiation image read out during said first exposure of said stimulable phosphor sheet to said stimulating rays and in the radiation image read out during said second exposure of said stimulable phosphor sheet to said stimulating rays, said first operation being expressed as $$B = A1us - \alpha \cdot A2us$$

where $\alpha$ is a coefficient, and $\alpha > 0$, whereby an image signal B is obtained, vii) thereafter carrying out a second operation on the image signal components of said read-out image signal A1, said read-out image signal A2, and said image signal B, which image signal components represent corresponding picture elements in the radiation images read out during said first and second exposures of said stimulable phosphor sheet to said stimulating rays and in the image represented by said image signal B, said second operation being expressed as $$C = (1 - \beta) \cdot A1 + \beta A2 - \gamma \cdot B$$

where $\beta$ and $\gamma$ are coefficients, $0 \leq \beta \leq 1$, and $\gamma > 0$, whereby an image signal C is obtained, and viii) reproducing a visible radiation image from said image signal C.

10. A method as defined in claim 9 wherein said radiation source is X-rays.

11. A method as defined in claim 9 wherein said stimulating rays are a laser beam.

12. A method for processing radiation images, which comprises the steps of:

i) locating a first stimulable phosphor sheet and a second stimulable phosphor sheet for storing energy from radiation thereon wherein first stimulable phosphor sheet may be closer to a radiation source than said second stimulable phosphor sheet is, and both said first stimulable phosphor sheet and said second stimulable phosphor sheet may stand facing said radiation source, ii) placing an object between said radiation source and said first stimulable phosphor sheet, iii) exposing said first stimulable phosphor sheet and said second stimulable phosphor sheet to radiation, which has been produced by said radiation source and which has then passed through said object, radiation images of said object being thereby stored respectively on said first stimulable phosphor sheet and said second stimulable phosphor sheet, iv) thereafter exposing each of said first stimulable phosphor sheet and said second stimulable phosphor sheet to stimulating rays, which cause each of said first stimulable phosphor sheet and said second stimulable phosphor sheet to emit light in proportion to the amount of energy stored thereon during said exposure to the radiation, each of the light emitted by said first stimulable phosphor sheet and the light emitted by said second stimulable phosphor sheet being photoelectrically detected by a photodetector, whereby a read-out image signal A1, which is made up of a series of image signal components representing picture elements in the radiation image stored on said first stimulable phosphor sheet, and a read-out image signal A2, which is made up of a series of image signal components representing picture elements in the radiation image stored on said second stimulable phosphor sheet, are obtained, v) thereafter passing said read-out image signal A1 through a low frequency component reducing filter, a read-out image signal A1f being thereby obtained, vi) passing said read-out image signal A2 through a high frequency component reducing filter, which has a characteristic such that the sum of said characteristic and the characteristic of said low frequency component reducing filter may be approximately flat, a read-out image signal A2f being thereby obtained, vii) thereafter adding said read-out image signal A1f and said read-out image signal A2f to each other, an image signal C' being thereby obtained, and viii) reproducing a visible radiation image from said image signal C'.

13. A method as defined in claim 12 wherein said low frequency component reducing filter is a low frequency cutting filter, and said high frequency component reducing filter is a high frequency cutting filter.

14. A method as defined in claim 12 wherein said radiation source is X-rays.

15. A method as defined in claim 12 wherein said stimulating rays are a laser beam.

16. A method for processing radiation images, which comprises the steps of:

i) locating a double-faced stimulable phosphor sheet having front and rear surfaces from which radiation images are read out, wherein said front surface stands facing a radiation source, ii) placing an object between said radiation source and said double-faced stimulable phosphor sheet, iii) exposing said double-faced stimulable phosphor sheet to radiation, which has been produced by said radiation source and which has then passed through said object, radiation images of said object being thereby stored respectively on said front surface and said rear surface of said double-faced stimulable phosphor sheet, iv) thereafter exposing each of said front surface and said rear surface of said double-faced stimulable phosphor sheet to stimulating rays, which cause each of said front surface and said rear surface of said double-faced stimulable phosphor sheet to emit light in proportion to the amount of energy stored thereon during said exposure to the radiation, each of the light emitted by said front surface of said double-faced stimulable phosphor sheet and the light emitted by said rear surface of said double-faced stimulable phosphor sheet being photoelectrically detected by a photodetector, whereby a read-out image signal A1, which is made up of a series of image signal components representing picture elements in the radiation image stored on said front surface of said double-faced stimulable phosphor sheet, and a read-out image signal A2, which is made up of a series of image signal components representing picture elements in the radiation image stored on said rear surface of said double-faced stimulable phosphor sheet, are obtained, v) thereafter passing said read-out image signal A1 through a low frequency component reducing filter, a read-out image signal A1f being thereby obtained, vi) passing said read-out image signal A2 through a high frequency component reducing filter, which has a characteristic such that the sum of said characteristic and the characteristic of said low frequency component reducing filter may be approximately flat, a read-out image signal A2f being thereby obtained, vii) thereafter adding said read-out image signal A1f and said read-out image signal A2f to each other, an image signal C' being thereby obtained, and viii) reproducing a visible radiation image from said image signal C'.

17. A method as defined in claim 16 wherein said low frequency component reducing filter is a low frequency cutting filter, and said high frequency component reducing filter is a high frequency cutting filter.

18. A method as defined in claim 16 wherein said radiation source is X-rays.

19. A method as defined in claim 16 wherein said stimulating rays are a laser beam.

20. A method for processing radiation images, which comprises the steps of:

i) locating a stimulable phosphor sheet, which is capable of storing energy from radiation thereon, wherein said stimulable phosphor sheet stands facing a radiation source, ii) placing an object between said radiation source and said stimulable phosphor sheet, iii) exposing said stimulable phosphor sheet to radiation, which has been produced by said radiation source and which has then passed through said object, a radiation image of said object being thereby stored on said stimulable phosphor sheet, iv) thereafter exposing said stimulable phosphor sheet twice to stimulating rays, which cause said stimulable phosphor sheet to emit light in proportion to the amount of energy stored thereon during its exposure to the radiation, each of the light, emitted by said stimulable phosphor sheet during said first exposure to said stimulating rays and the light emitted by said stimulable phosphor sheet during said second exposure to said stimulating rays and the light emitted by said a photodetector, whereby a read-out image signal A1 and a read-out image signal A2, each of which is made up of a series of image signal components representing picture elements in the radiation image stored on said stimulable phosphor sheet, are obtained respectively during said first exposure of said stimulable phosphor sheet to said stimulating rays and during said second exposure of said stimulable phosphor sheet to said stimulating rays, v) thereafter passing said read-out image signal A1 through a low frequency component reducing filter, a read-out image signal A1f being thereby obtained, vi) passing said read-out image signal A2 through a high frequency component reducing filter, which has a characteristic such that the sum of said characteristic and the characteristic of said low frequency component reducing filter may be approximately flat, a read-out image signal A2f being thereby obtained, vii) thereafter adding said read-out image signal A1f and said read-out image signal A2f to each other, an image signal C' being thereby obtained, and viii) reproducing a visible radiation image from said image signal C'.

21. A method as defined in claim 20 wherein said low frequency component reducing filter is a low frequency cutting filter, and said high frequency component reducing filter is a high frequency cutting filter.

22. A method, as defined in claim 20 wherein said radiation source is X-rays.

23. A method as defined in claim 20 wherein said stimulating rays are a laser beam.

* * * * *